July 3, 1934.　　　　　L. B. KRICK　　　　　1,965,292
FROZEN CONFECTION
Filed June 22, 1932　　　2 Sheets-Sheet 1
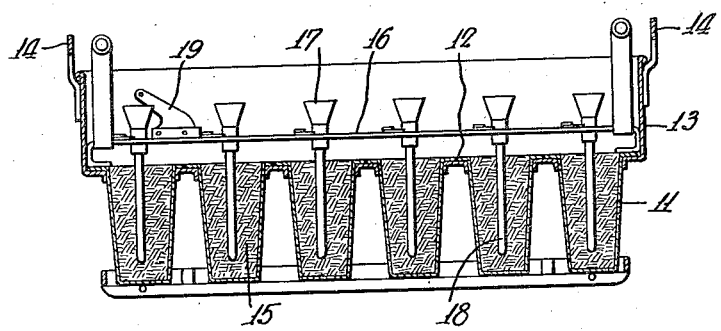
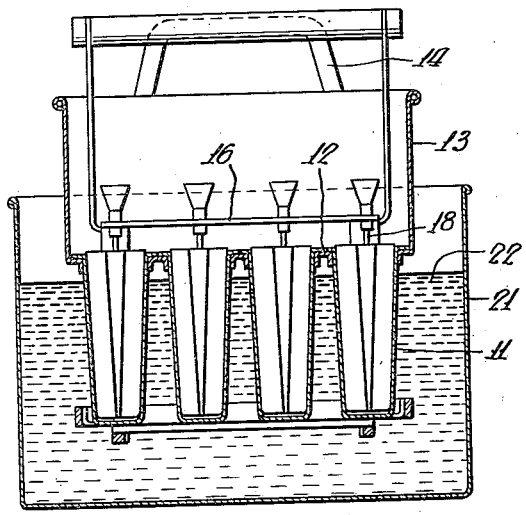
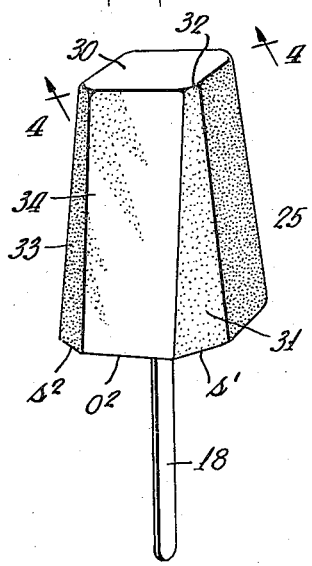
INVENTOR
Leonard B. Krick
BY
ATTORNEYS July 3, 1934.  L. B. KRICK  1,965,292
FROZEN CONFECTION
Filed June 22, 1932   2 Sheets-Sheet 2
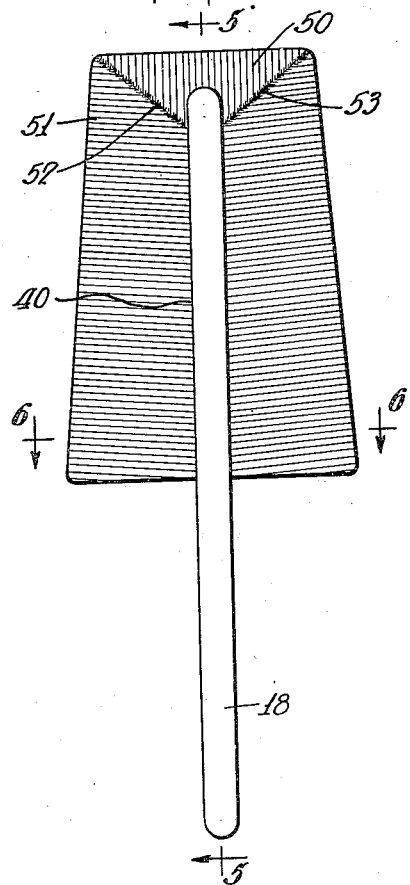
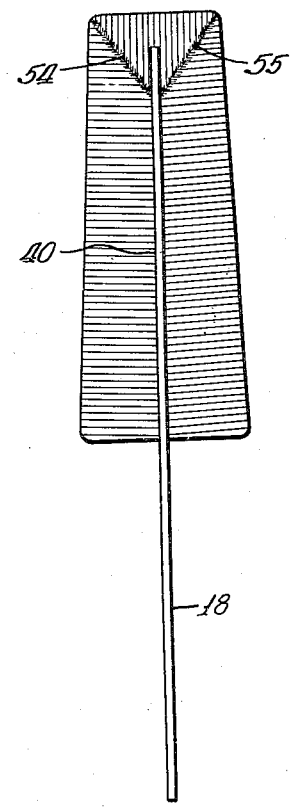
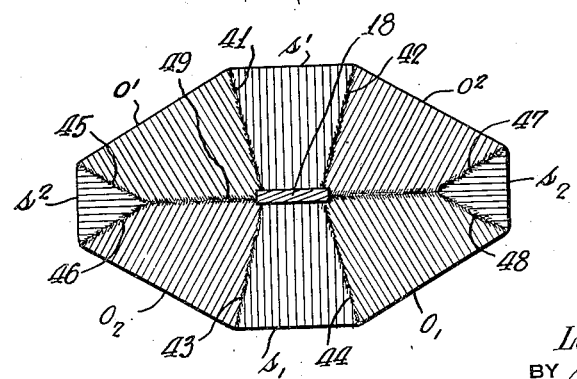
INVENTOR
Leonard B. Krick
BY
ATTORNEYS Patented July 3, 1934

UNITED STATES PATENT OFFICE 1,965,292

FROZEN CONFECTION

Leonard B. Krick, Chicago, Ill., assignor to The Popsicle Corporation of the United States, New York, N. Y., a corporation of Delaware Application June 22, 1932, Serial No. 618,646

4 Claims. (Cl. 99—11)

My present invention relates more especially to frozen confections of the general type described in the prior patent to Frank W. Epperson No. 1,505,592, granted August 19, 1924.

In the confection disclosed as preferred and shown in the drawings of said prior patent, the circular contour is employed, thereby to secure minimum of exposed surface per unit of length, and to afford radial orientation of the spiny crystals, the inner ends of which engage the handle stick. Though the confection is thus satisfactorily held to the stick this is accomplished at the sacrifice of external appearance, the shape in general having proved unattractive to adults.

An object of the invention is to provide a confection of the above type, in which the orientation of the crystalline structure is so controlled as to effect a strongly coherent structure unlikely to break or chip, attractive to the eye, convenient for eating and presenting a peripheral area large relative to the volume of the structure, yet not likely to drip, and in which the security of bond with respect to the handle stick, preferably though not necessarily used, is adequate for all practical purposes.

According to a feature of the invention the confection is frozen in a mold presenting symmetrically arranged dihedral angles which are inclined with respect to the axis of the confection. The spiny crystals extending inwardly normally from the mold surface in manufacture of the confection, it follows that the crystals intermesh substantially along bisecting planes of the respective dihedral angles, thereby to provide reinforcing planes of suture which mechanically strengthen the confection in its entirety so that it is unlikely to chip or break.

Another feature is the control of those of the spiny crystals of the confection which become bonded to the handle stick. The spiny crystals being normal to the oblique surfaces of the confection, they enter obliquely with respect to the length of the handle stick and the weight of the confection is therefore sustained on the handle stick not merely by a transverse bond but by a trussed-bond.

Another feature is the greater mass per unit of length of the confection near the lower end thereof during eating, which serves by latent refrigeration to intercept any eventual meltings from the reduced upper end being eaten.

In the accompanying drawings in which is shown one of various possible embodiments of the several features of the invention, Fig. 1 is a view in longitudinal cross-section, illustrating the mold and stick holding apparatus preferably used for producing the confection, Fig. 2 is a transverse cross-sectional view of the mold shown in Fig. 1 after it has been placed in the brine tank, Fig. 3 is a perspective view of the completed confection, Fig. 4 is a transverse sectional view taken on line 4—4 of Fig. 3, Fig. 5 is a longitudinal sectional view taken on line 5—5 of Fig. 4, and Fig. 6 is a transverse sectional view taken on line 6—6 of Fig. 4.

Referring now to the drawings, there is illustrated in Fig. 1 a mold of an approved design, used for frozen confectionery products, including illustratively, generally frusto-pyramidal ornamental mold cavities 11, fixed to a base plate 12, from which rises a flange 13, having handles 14 at the opposite ends thereof.

The flavored syrup or mix 15 is poured into the mold 10 by conventional means, (not shown), filling the individual cavities 11. Thereupon a stick centering unit or gauge 16 is positioned within the flange 13 of the mold. This centering device includes funnels 17 into which individual handle members or sticks 18, preferably of wood, are inserted and clamping means 19, the details of which need not be explained, for releasably holding the sticks and positioning them centrally of the mold cavities.

The assembled mold unit, including a stick handling device, is then placed in a brine tank 21, through which refrigerating brine 22 is continuously circulated by mechanical means (not shown).

As soon as the congelation or solidification of the contents of the mold is completed, it is removed from the brine tank and dipped momentarily into a tank of warm water (not shown). This process melts the confection surface adjacent the mold, breaking the bond therebetween, and permits ready removal of the confection bodies from the mold.

Having particular reference to Figs. 3, 4, 5 and 6, a shape of mold and confection particularly desirable for various reasons more fully set forth hereinafter, involves an attractive geometrical configuration having a cross-section of length almost twice its width, and preferably of octagonal perimeter at each cross-section throughout most or all of the length of the configuration. The octagonal cross-section presents a pair of parallel sides, $s^1$ and $s_1$ and a pair of parallel sides $s^2$ and $s_2$ at right angles to said first pair. Oblique pairs of sides $o_1$ and $o^1$; $o_2$ and $o^2$ of greater length connect the sides $s$. The configuration tapers, as best shown in Fig. 3, to a free end 30 of generally rhombus shape. The lateral surfaces 31 of the configuration, determined by sides $s_1$ and $s^1$, are generally triangular, tapering fairly sharply to a blunt point 32. The same is true of the lateral surfaces 33, determined by sides $s_2$ and $s^2$. The lateral edges of each of the surfaces 34, determined by cross-section sides $o_1$, $o^1$, $o_2$ and $o^2$, are substantially parallel, said surfaces being generally rhomboidal in shape as shown. While the invention in its broadest aspect is by no means limited to the particular shape of mold and confection described, this shape has certain peculiar advantages to be set forth hereinafter.

The mix during freezing being kept without agitation in the respective molds, the crystals are not broken up but grow inwardly from the respective oblique surfaces of the mold normally thereto. The syrup or mix having soaked well into the handle stick by the time the refrigeration has progressed inwardly sufficiently to reach the same, the oblique spiny crystals will penetrate the vertical stick as best shown at 40 in Figs. 4 and 5, thereby forming an improved oblique trussed-bond.

The individual crystals extending normally to the respective mold surfaces, for instance, normally to surfaces $s^1$ and $o^1$ in Fig. 6, will intersect substantially along the bisecting plane 41 of the dihedral angle between the said two surfaces. The set of crystals from the one plane blocking the further advance of the set of crystals from the neighboring plane, the crystal ends become intermeshed and deflected into a bonding or suture plane 41, where the crystals are knit together as it were, for enhanced strength thereat.

In the manner set forth a strengthening plane is thus formed along the bisecting plane of each dihedral angle of the configuration. The resulting structure is thus reinforced longitudinally and transversely along planes 41, 42, 43, 44, 45, 46, 47 and 48. The spiny crystals from planes $o^1$ and $o^2$ are intercepted respectively by those crystals from planes $o_1$ and $o_2$ determining a reinforcing suture plane 49 along the longitudinal major axis of the configuration, and merging at its opposite ends with the intersection of the suture planes 45, 46 and 47, 48 respectively. The width of the handle stick 18 extends along and through suture plane 49, at which a particularly secure bond will occur.

Similarly the upward freezing from the reduced end of the confection results in the vertical crystals intersecting those at 51, extending inward from the lateral surfaces, as best shown in Figs. 4 and 5, producing a pyramidal cap 50 intimately bonded or interlinked at its oblique faces with the rest of the confection, at suture planes 52, 53, 54 and 55.

Thus the generally ornamental shape of mold and confection illustrated, results when the congelation is conducted as set forth, not only in a firm trussed-bond with respect to the stick but in an internal reinforcement of the confection along a distinct pattern of critical planes, producing a structure inherently strong despite the fact that only a relatively small proportion of the spiny crystals reaches or penetrates the holding stick. The confection presents no particular or preferential plane of cleavage. The confection is a strong coherent structure not readily broken or chipped under any impacts incurred in ordinary handling. The confection is of convenient shape for eating. It can be nibbled or sucked from the sharp angles of the rhombus end 30. Any eventual meltings from this end occurring in warm weather will be intercepted and become refrozen by the latent refrigeration concentrated at the greatly enlarged mass at the lower end of the confection from which the handle projects. Loss and annoyance due to dripping therefore presents no problem.

While the confection in certain broader aspects is an improved coherent product even though devoid of a handle stick, the handled form is preferred.

It will thus be seen that there is herein described an article in which the several features of this invention are embodied, and which article attains the various objects of the invention and is well suited to meet the requirements of practical use.

As many changes could be made in the above article, and many apparently widely different embodiments of this invention could be made without departing from the scope thereof, it is intended that all matter contained in the above description shall be interpreted as illustrative and not in a limiting sense.

What I claim is:—

1. A confectionery product of the character described, comprising a handle core and a body of frozen edible material bonded thereto by congelation, said body having in spaced relation circumferentially of said core a plurality of obtuse dihedral angles extending longitudinally thereof, and reinforcing sutures extending inwardly between the planes of said angles, said sutures preventing the formation of relatively large continuous areas of crystalline structure in the confection body.

2. A confectionery product of the character described, comprising a handle core and a body of frozen edible material bonded thereto by congelation, said body having a plurality of exterior faces disposed circumferentially of said core and forming obtuse dihedral angles extending longitudinally thereof, said body having reinforcing sutures extending inwardly between adjacent faces preventing the formatioin of relatively large continuous areas of crystalline structure in the confection.

3. A confectionery product of the character described, comprising a handle core and a body of frozen edible material bonded thereto by congelation, said body having a plurality of exterior faces disposed circumferentially of said core and forming obtuse dihedral angles extending longitudinally thereof, said body having reinforcing sutures extending inwardly along the bisecting planes of said angles preventing the formation of relatively large continuous areas of crystalline structure in the confection.

4. A confection of the character described, comprising a handle core and a body of frozen edible material bonded thereto by congelation, the exterior surface of the body having a plurality of faces disposed obliquely to one another circumferentially of the core forming a plurality of obtuse dihedral angles longitudinally thereof, said body having reinforcing sutures extending inwardly along the bisecting planes of said angles, said reinforcing sutures being spaced circumferentially of the body, dividing it into a plurality of sections thereby preventing the formation of relatively large continuous areas of crystalline structure in the frozen body portion.

LEONARD B. KRICK.